(12) United States Patent
Duschl et al.

(10) Patent No.: US 8,674,604 B2
(45) Date of Patent: Mar. 18, 2014

(54) ACTIVATION MODULE FOR A GAS DISCHARGE LAMP

(75) Inventors: Anton Duschl, Hauzenberg (DE); Roman Schichl, Passau (DE); Udo Mai, Untergriessbach (DE)

(73) Assignee: Sumida Components & Modules GmbH, Obernzeli (DE)

( * ) Notice: Subject to any disclaimer, the term of this patent is extended or adjusted under 35 U.S.C. 154(b) by 0 days.

(21) Appl. No.: 13/381,869

(22) PCT Filed: Jul. 2, 2010

(86) PCT No.: PCT/EP2010/003998
§ 371 (c)(1),
(2), (4) Date: Mar. 13, 2012

(87) PCT Pub. No.: WO2011/000571
PCT Pub. Date: Jan. 6, 2011

(65) Prior Publication Data
US 2012/0161659 A1    Jun. 28, 2012

(30) Foreign Application Priority Data
Jul. 3, 2009  (DE) .......................... 10 2009 033 068

(51) Int. Cl.
*H05B 41/36* (2006.01)
*H05K 13/00* (2006.01)
*B06B 1/02* (2006.01)

(52) U.S. Cl.
USPC .......................... 315/82; 315/239; 313/318.01

(58) Field of Classification Search
USPC .................... 315/77, 82, 208, 239, 349, 354; 313/318.01
See application file for complete search history.

(56) References Cited

U.S. PATENT DOCUMENTS

| | | | |
|---|---|---|---|
| 5,434,763 A * | 7/1995 | Hege et al. ................. | 362/265 |
| 6,043,613 A | 3/2000 | Schultz et al. .............. | 315/248 |
| 6,194,834 B1 * | 2/2001 | Seiler et al. ................ | 315/82 |
| 7,575,477 B2 | 8/2009 | Takahashi .................. | 439/620.02 |
| 2006/0174330 A1 * | 8/2006 | Yoon et al. ................. | 726/4 |
| 2006/0227254 A1 | 10/2006 | Kato et al. .................. | 348/836 |
| 2008/0309240 A1 | 12/2008 | Goray et al. ............... | 315/56 |
| 2010/0225242 A1 | 9/2010 | Saveliev .................... | 315/276 |
| 2011/0234096 A1 * | 9/2011 | Asmussen et al. .......... | 315/53 |

FOREIGN PATENT DOCUMENTS

| | | |
|---|---|---|
| CN | 1245970 | 3/2000 |
| CN | 101208769 A | 6/2008 |
| JP | 08-318624 | 12/1996 |
| JP | 2003-317535 | 11/2003 |
| WO | WO 2006/119799 | 11/2006 |

\* cited by examiner

*Primary Examiner* — Don Le
(74) *Attorney, Agent, or Firm* — Fattibene and Fattibene LLC; Paul A. Fattibene (57) ABSTRACT

A driving module for a gas discharge lamp, in particular for headlights in vehicles, comprises a suitable lamp socket, a carrier for electrical components, and an ignition transformer, wherein the component part carrier is populated at least with electrical components of an ignition unit and moreover is designed for accommodating further electrical components that are required for a self-sustaining operation of the driving module. In addition, the lamp socket is made of a high temperature resistant plastic material and has an integrated high-voltage conducting track.

38 Claims, 7 Drawing Sheets

ACTIVATION MODULE FOR A GAS DISCHARGE LAMP

CONTINUING DATA

This application is a 371 of PCT/EP10/03998 filed Jul. 2, 2010.

FIELD OF THE INVENTION

The present invention relates generally to modules for supplying and activating gas discharge lamps, e.g. ignition modules, ballasts and the like, and compact component part carriers for receiving thereon the electrical components, a compact structural design being accomplished in this way e.g. for a xenon lamp for headlights of the type increasingly used in the automotive field.

BACKGROUND OF THE INVENTION

When gas discharge lamps, e.g. xenon lamps, are used especially in the automotive field and also in other fields of use in which the discharge lamp control electronics has to meet increased requirements, which is the case e.g. in the field of use for mobile devices, high demands on the electric strength and reliability have to be satisfied on the one hand, while compact dimensions are also necessary on the other hand. In addition, the electronic components, including the ignition transformer, required for operating discharge lamps and in particular for igniting these discharge lamps should be mountable in an economy-priced and reliable manner, and also the mechanical fixing of the electronic components, e.g. of the ignition transformer, is of great importance in this context.

Especially for igniting a discharge lamp, comparatively high voltages in the range of a few 10 kilovolts (kV), e.g. of approx. 30 kV, are required, as is generally known, so as to initiate a reliable ignition of the gas mixture in the discharge chamber of the respective lamp, which is often also referred to as arc tube. The necessary high ignition voltage is normally generated by means of an ignition transformer, which has supplied thereto a comparatively low primary voltage of approximately a few hundred volts from an associated electronic ballast and which then transforms this primary voltage to the high ignition voltage. If the dimensions of respective functional groups, e.g. of the ballast and of the ignition unit, are reduced, it will therefore be necessary to provide also the ignition transformer in a suitable configuration, e.g. with respect to the geometrical and magnetic nature of the core material and the provision of the primary winding and of the secondary winding, so as to produce the necessary high ignition voltage on the one hand and so as to guarantee nevertheless the necessary high electric strength on the other. To this end, it is necessary to provide sufficiently large insulation tracks, in particular in the area of the ignition transformer, and also in the area of other electronic components so as to guarantee a reliable functioning of the ignition system under demanding ambient conditions, as is e.g. the case when the ignition system is used in the automotive field, where the respective electronic components have to be operated over a large temperature range and under respective environmental influences, such as snow, rain, moisture, mechanical vibration loads and the like, in an environment with high disturbance wave emission. During assembly of an ignition module, the electronic components and the ignition transformer therefore have to be arranged on one or on a plurality of suitable component part carriers in such a way that the mechanical reliability and therefore also the reliability of the respective electric connections remains observed under these demanding conditions and that also the necessary electric strength is guaranteed between the various electric connections at different potentials. To this end, suitable plastic materials are often provided in the vicinity of the critical components of the component part carrier, whereby suitable insulation tracks are obtained. For example, attempts are often made to provide adequate "labyrinths" of plastic walls at least in the finished, mounted condition of an ignition module so that e.g. critical areas, such as the high-voltage connection of the ignition transformer as well as the connection region of the discharge lamp, are surrounded by voltage-resistant plastic material. These areas must, however, be easily accessible during assembly of the ignition module so that a reliable electric connection can be established, e.g. by welding or soldering. For example, known ignition modules include a component part carrier with a plurality of components, said components interengaging during final assembly such that the desired plastic insulation tracks are established in the critical high-voltage areas.

In addition, for obtaining the necessary mechanical and electrical reliability of the ignition transformer, the latter is, normally after having been fixed to the component part carrier and after having been electrically connected, encompassed with potting material. One of the components of the component part carrier comprises, for example, a suitable chamber into which the ignition transformer is inserted, then connected and finally potted. During potting of the ignition transformer, it is very important for an increased reliability that the respective potting chamber is filled without any cavities being formed, so as to guarantee the mechanical properties as well as the electric properties even under demanding environmental conditions. During the assembly of the ignition transformer and in particular during the formation of the electric connection to a high-voltage conducting track, which, in turn, establishes a connection to the discharge lamp, welding methods making e.g. use of a laser, or soldering methods making use of suitable flux materials, are normally carried out. In so doing, smoke residues may be formed, especially during welding processes, said smoke residues depositing on the adjacent walls of the potting chamber, thus having a negative influence on the adhesion of the potting material during the subsequent potting of the potting chamber, and/or contaminating the potting material directly, which will then also lead to an impairment of the electric strength. This unsatisfactory adhesion of the potting material results in a reduced reliability with respect to mechanical loads, e.g. vibration loads, and especially with respect to the electric strength of the whole setup. In a similar way, also the use of a flux material for a soldering process leads to a contamination of the adjacent potting chamber walls, and this may again lead to an impaired adhesion of the potting material during the subsequent process. The problem of an insufficient adhesion of the potting material becomes even more prominent, when the dimensions of a respective ignition module are to be reduced, since also the dimensions of the respective potting chamber normally have to be reduced in this case. This results, on the one hand, in an increase in the total demands on the ultimately necessary electric strength, and, on the other hand, it may also lead to a stronger contamination of the potting chamber walls.

Especially for a further miniaturization of respective ignition modules, which are used e.g. for headlights in vehicles and also for other applications, it is therefore normally necessary to use, in addition to a suitable arrangement and fixing of the electrical components of the ignition module for observing the necessary electric strength, possibly also complicated methods for decontaminating the potting chamber walls, and this, in turn, leads to a very complicated manufacturing process during production of the ignition module. If further electrical components should be integrated, which are required e.g. for controlling the operation of the gas discharge lamp prior to, during and after the ignition, even higher demands have to be fulfilled in the case of the desired compact structural design, in particular in the automotive field, since also thermal aspects have to be taken into account in addition to the electric strength and the interference resistance, i.e. the thermal losses which occur when respective circuit groups are operated and which are caused e.g. by voltage transformers and the like, in combination with the heat transmitted to the lamp socket through the discharge lamp, lead to locally high temperatures, and this had normally the effect that the ignition module in combination with the lamp socket on the one hand and the additional electronic components in the form of a ballast were configured as separate units, which, via a cable connection, are arranged in spaced relationship with one another. Although this reduces the problems entailed by the electromagnetic disturbance of the individual circuit areas as well as the thermal characteristics of the spatially separated circuit areas, a much higher expenditure is necessary with respect to the overall material cost as well as the assembly of the discharge lamp and the associated control electronics, since two housings as well as adequate connection elements are required.

SUMMARY OF THE INVENTION

Against this technical background, it is an object of the present invention to provide a module for driving a gas discharge lamp and in particular a discharge lamp for mobile use or vehicles, the function of an ignition module in connection with a lamp socket and the possibility of integrating additional electrical components in a component assembly being given.

According to one aspect of the present invention, an driving module for a gas discharge lamp is provided for achieving this object. The driving module comprises a carrier for accommodating electrical components for igniting and operating the gas discharge lamp after the ignition, and an ignition transformer fixed in position on the carrier. In addition, the driving module comprises at least a part of the lamp socket attached to the carrier and composed of a high temperature resistant plastic material, which is dimensionally stable at least at temperatures higher than 105° C. and which includes an integrated conductor for connecting a high-voltage connection of the gas discharge lamp to a high-voltage connection of the ignition transformer. The driving module additionally comprises a plurality of electrical components fixed to the carrier and configured for supplying, in association with the ignition transformer, the gas discharge lamp with energy at least during the ignition process.

The driving module according to the present invention thus comprises a carrier capable of accommodating electrical components which are required for igniting as well as for operating the gas discharge lamp after ignition. The installation space required for the electrical components as well as the three-dimensional arrangement of the electrical components is thus determined by design measures, i.e. by the shape and by the nature of the material of the carrier. This allows first to dispose the electrical components required for ignition and the components required for operating the discharge lamp after ignition in an arrangement which is suitable for a trouble-free and reliable operation. Furthermore, the carrier has attached thereto a lamp socket which, due to the thermal characteristics, is able to cope with the comparatively high temperatures occurring when the discharge lamp is in operation, i.e. which is dimensionally stable and exhibits little outgassing or no outgassing at all. A high temperature resistant plastic material is here used, which has an increased thermal loadability and which, in addition, has a conducting track integrated therein, so that in particular the high-voltage connection between the gas discharge lamp and the ignition transformer is established in a reliable manner. The integrated conducting track ensures that the necessary high electric strength is guaranteed also in the case of a compact structural design, since, due to the reliable embedding of the conducting track, comparatively short insulation tracks are sufficient. In addition, a plurality of electrical components is fixed to the carrier in the driving module according to the present invention, said electrical components supplying, in association with the ignition transformer, the gas discharge lamp with energy at least during the ignition process, i.e. the electrical components, including the ignition transformer, provided in the driving module according to the present invention define at least an ignition module. Additional electrical components can already be provided when the components for the ignition unit are being mounted, or they can be attached to the carrier in a suitable way during an arbitrary future suitable mounting phase. Due to the structural design of the carrier, the position of the additional components is reliably predetermined through structural characteristics of the carrier even if mounting should only take place later on. In this way, a setup is provided, which is suitable with respect to vibration resistance, thermomanagement, etc.

According to a further advantageous embodiment, at least a part of the carrier is composed of a plastic material having a lower temperature resistance than the lamp socket, whereby a substantial cost advantage with respect to the construction of the driving module is achieved, since the lamp socket can be composed of suitable plastic materials, e.g. PPS (polyphenylene sulfide) with a melting point of approx. 285° C., LCP (liquid crystal polymer) and the like, whereas a part of the carrier or the carrier in its entirety is produced from other plastic materials, e.g. PA (polyamide), PBT (polybutylene terephthalate), and the like. The carrier may, for example, be produced in the form of a suitable housing consisting of an economy-priced plastic material, the temperature-resistant plastic material of the lamp socket being then mounted on and in said housing in a suitable manner, e.g. by glueing, heat staking, hot gas riveting, crimping, etc.

According to a further advantageous embodiment, the lamp socket additionally comprises a low-voltage connection region configured for contacting a low-voltage connection of the discharge lamp and for establishing a connection to a low-voltage line of the driving module. On the basis of the plastic material, reliable contacting of the two connections of the discharge lamp is therefore possible while observing the necessary insulation tracks, both connections being embedded in the high temperature resistant material of the lamp socket and having therefore the necessary temperature resistance.

According to other advantageous embodiments, the lamp socket additionally comprises a high-voltage connection region which is adapted to be insulated by a high-voltage cap such that it is resistant to high voltages, whereas in other embodiments the lamp socket comprises a high-voltage connection region surrounded by a potting space for receiving therein a potting material after contacting of the high-voltage connection of the discharge lamp. These design modes therefore offer a high degree of flexibility, since, making e.g. use of the high-voltage cap, it is possible to cover the high-voltage connection region without potting. On the other hand, the embodiment comprising the potting space offers the possibility of potting during an arbitrary suitable mounting phase, so that reduced corona formation will be accomplished, if necessary.

According to a further embodiment, the driving module comprises a potting chamber which laterally encompasses the ignition transformer and which is filled with a potting material. This results in a high insulation strength, and, especially through a suitable selection of the characteristics of the ignition transformer, e.g. an open structural design, fast and void-free vacuum potting is accomplished.

According to other advantageous embodiments, a ferrite material is provided at least in an area adjacent to the ignition transformer. This measure allows, on the one hand, an improvement of the overall magnetic flux in the vicinity of the ignition transformer, which, due to the demanded high degree of compactness, is often implemented in the form of a non-closed transformer, so that the magnetic behavior, which is in principle less efficient, can be compensated in this way and a comparatively small number of windings can be accomplished in the secondary winding. On the other hand, the ferrite material may also serve as an efficient shielding material with respect to magnetic disturbances. The ferrite material may be provided e.g. in the form of a ferrite plate in the interior of the potting chamber, if a better magnetic flux should e.g. be desired in close vicinity to the ignition transformer. In addition, some embodiments are so conceived that a respective ferrite plate is arranged on each end face of a non-closed transformer, i.e. a transformer with a magnetic core having no closed magnetic flux within the core material. For example, rod-shaped transformers are frequently used, so that the provision of additional ferrite plates, e.g. on the end faces and/or on one or more lateral surfaces, will result in an improved magnetic behavior, and a very compact structural design will be possible. In addition, other than in the case of closed transformer arrangements, e.g. in the form of a ring core, a more efficient automatic winding operation is here possible, and this is advantageous in particular with respect to the reproducibility of the transformer data as well as an economy-priced mounting.

According to some embodiments, ferrite material is integrated in the potting material surrounding the ignition transformer, and/or in one or a plurality of wall areas of the potting chamber. In this way, it is possible to accomplish a very compact structural design and to substantially improve the magnetic characteristics of the ignition transformer at the same time. The integrated ferrite materials may perhaps also result in an improved thermal conductivity of the carrier material, so that, in total, also an improved distribution of the waste heat produced in the driving module is possible.

According to another advantageous embodiment, the carrier comprises a base plate and at least side parts, said base plate and/or one or a plurality of said side parts being composed of a plastic material, and said plastic material having integrated therein one or a plurality of conductive or non-conductive materials containing metal. According to this embodiment, the carrier can be provided in the form of a housing or in the form of some other suitable construction, the characteristics of the plastic materials being adjusted in a suitable manner by the additionally integrated components, i.e. desired characteristics can be produced locally or globally within the carrier in an efficient production process in a reproducible manner, e.g. with respect to the incorporation of conducting tracks, the adjustment of magnetic characteristics in the form of ferrite materials, the adaptation of the thermal conductivity and the like. In this respect, e.g. aluminum oxide is a suitable material for obtaining a high thermal conductivity and maintaining nevertheless a desired electric strength. Alternatively or additionally, metal tracks, e.g. in the form of foils, metal pieces and the like, can be integrated in the plastic material, so that the electric and/or the thermal conductivity is adjusted in a suitable manner. In addition, e.g. one or a plurality of the integrated metal tracks may also act as conducting tracks, so that the wiring of the driving module is partially accommodated in the material of the carrier, thus contributing to increased robustness with respect to environmental influences, while allowing simultaneously a very high insulation strength on the basis of small distances. According to another advantageous embodiment, the contour of the carrier is adapted to the contour of at least some of the electrical components for improving the vibration resistance. This kind of structural design of the carrier is particularly advantageous in cases of use in which a high degree of mechanical loads occurs in the form of oscillations and vibrations. These cases of use include especially the use of the driving module in combination with the gas discharge lamp as part of a vehicle headlamp, since, on the basis of this structural design, comparatively large electrical components, such as a capacitor, which is typically used in an ignition module, and a discharger, can efficiently be secured to the carrier without any additional measures being necessary or without undesirable strong mechanical loads acting on the respective electric connections.

According to a further advantageous embodiment, the electrical components define an ignition unit as a first functional group of the driving module, at least some of the conducting tracks of the ignition unit being integrated in the material of the carrier. In this way, at least the connections of some of the electrical components of the ignition unit can be provided in a robust and reliable manner within the material of the carrier, so that, as regards the overall design of the carrier, a higher degree of flexibility is given with respect to the accommodation of additional electrical components, which are used for continuously operating the gas discharge lamp.

According to an additional embodiment, a second functional group comprising additional electrical components is provided, at least some of said electrical components being mounted on a printed circuit board which is connected to the ignition unit via connections fixed to the carrier. This modular design allows an independent production of the driving module on the one hand, i.e. of the carrier with the ignition transformer and some electrical components, and of the printed circuit board on the other hand, the connections allowing a fast, robust, efficient coupling of the electrical components during the final assembly. At least some of the connections may be solderless connections, and also this contributes to an assembly operation that can be executed with less effort. According to one embodiment, the printed circuit board is configured as a molded interconnect device (MID), whereby a high degree of flexibility is obtained as regards the selection of the materials for the printed circuit board as well as the conducting tracks formed on and in said printed circuit board. According to other embodiments, a part of the printed circuit board can be provided in the form of the carrier material so that several electrical components, which require a greater effort or more space when separate printed circuit boards are being populated, are already provided on the carrier within the framework of the mounting operation of the ignition transformer as well as of additional electrical components of the ignition unit. For example, comparatively large components, e.g. inductances, additional transformers and the like, can be fixed to the carrier in a suitable manner and they can already be wired on or in the carrier. If necessary, the contour of the carrier is adapted to one or to a plurality of these additional electrical components in such a way that a high vibration resistance will be obtained, as has already been explained hereinbefore. The shapes of the printed circuit board and of the carrier can be adapted to one another so that a compact structural design and the necessary mechanical and electrical robustness are obtained, also the thermal conditions being established such that a local generation of inadmissibly high temperatures will be prevented. The printed circuit board may, for example, comprise at least two circuit board areas extending at an angle relative to one another, so that also a "three-dimensional" distribution of the electrical components required for controlling the ignition process, for controlling the continuous operation and the like, will be possible.

According to further embodiments, a shielding material is disposed between conducting tracks of the printed circuit board and the ignition transformer, so that the degree of electromagnetic influence, caused e.g. by the ignition transformer at the moment of ignition or during continuous operation, when a clocked voltage is supplied via the ignition transformer to the discharge lamp, will be reduced. The shielding material may here purposefully shield magnetic disturbances or it may be provided in the form of a conductive material. According to one embodiment, the shielding material, provided e.g. in the form of a ferrite material, is a component part of the printed circuit board.

According to another embodiment, at least one further electrical component, which is not a constituent part of the ignition unit, is fixed directly to the carrier. This can be done such that a high degree of vibration resistance will be guaranteed, as has already been described hereinbefore. According to one embodiment, this further electrical component is an inductive component, e.g. a coil or a transformer, these components being required for providing a suitable alternating voltage or direct voltage for continuously operating the discharge lamp.

According to a further embodiment, the lamp socket is suitable for accommodating a discharge lamp with a wattage in the range of 15 to 60 Watts. On the basis of this structural design, the driving module is well suited for use in headlights in mobile devices, in vehicles and the like, an overall installed size of approx. 60 cm$^3$ or substantially less then 60 cm$^3$ being obtained on the basis of the compact structural design.

According to a further aspect of the present invention, the above-mentioned object is achieved by a method of producing an driving module for a discharge lamp. The method comprises the step of connecting a conducting track, which is partially integrated in the plastic material of the lamp socket, to an ignition transformer of an ignition unit of the driving module. In addition, the ignition transformer is introduced into a potting chamber after connection, said potting chamber being attached to a carrier of the driving module. Subsequently, the potting chamber is filled with a potting material.

On the basis of this method according to the present invention, a connection between the ignition transformer and the lamp socket is first established. This is done at a sufficiently large spatial distance from the actual carrier and especially from the potting chamber, so that the disadvantageous effects of the formation of the high-voltage connection, e.g. by welding, soldering and the like, can reliably be avoided, i.e. the difficulties mentioned at the beginning, e.g. due to the formation of smoke residues, etc., which normally lead to a contamination of the potting chamber of an ignition transformer, are avoided in that the connection is not established in the vicinity of the potting chamber and in that the latter is only provided with the ignition transformer when the connection has been established.

In addition, according to an illustrative embodiment, the insertion of the ignition transformer into a potting chamber may also comprise the step of mechanically fixing the lamp socket to the carrier outside of the potting chamber prior to filling the potting chamber, so that a sufficient mechanical fixing for potting the ignition transformer will thus already be given. Fixing of the lamp socket to the carrier can be accomplished by glueing, heat staking, hot gas riveting, crimping, etc.

According to another advantageous embodiment, the lamp socket is mechanically fixed such that a passage in the potting chamber used for passing a conducting track therethrough is sealed. Such an embodiment is therefore so conceived that a connection is provided between the potting chamber and the rest of the carrier, so that a part of the connection of the lamp socket to the ignition transformer is accommodated in this passage. The connection may be embedded in a suitable plastic material, which simultaneously serves as a closure for the passage.

According to another advantageous embodiment, the method comprises producing, in one or in a plurality of plastic walls of the carrier, one or a plurality of connection conducting tracks for connecting electrical components. In this way, at least some of the necessary electric connections are provided in a space-saving and reproducible manner. According to one embodiment, recesses are formed in said one or said plurality of plastic walls of the carrier. It is thus possible to insert the necessary conducting tracks after the production of the carrier and to fix them, if necessary, by means of suitable connection techniques, e.g. heat staking, etc. In comparison with carriers having conducting tracks integrated therein, this results in lower tool costs, since an expensive in-line injection molding process for the conducting tracks will not be necessary. The carrier can thus be produced e.g. in the form of a housing without any metal inserts by a two plate mold, which leads again to substantial cost advantages.

According to a further embodiment, the method comprises integrating a material in the plastic material of the carrier so as to increase the shielding effect and/or the thermal conductivity. This means that suitable conductors, ferrite materials and, quite generally, metal-containing conducting or non-conducting materials can be incorporated in the desired manner so as to improve the thermal conductivity. According to some embodiments, various functional layers are provided in the material of the carrier, e.g. a conducting track or a metal foil, which thus contributes to a higher thermal conductivity, so that locally generated heat, e.g. in the vicinity of the lamp socket, can be distributed efficiently over the whole housing or at least over a large part thereof, whereby the resultant thermal losses can be dissipated, without any additional complicated measures being necessary. In other cases, ferrite materials may be provided in combination with conductive materials as a layered structure, so that efficient electric and magnetic shielding will be achieved, whereby also the thermal conductivity can be improved substantially.

Additional embodiments are also defined in the subclaims and are also disclosed by the following detailed description, which refers to the accompanying figures, in which:

DETAILED DESCRIPTION OF THE PREFERRED EMBODIMENTS

Figure 1A:
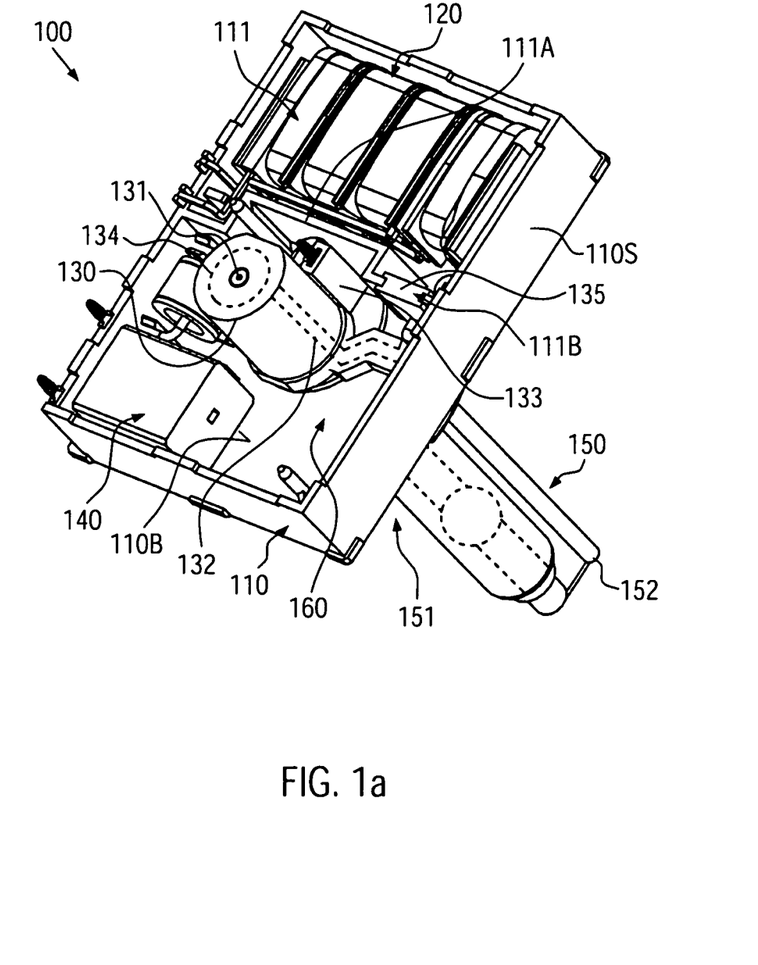
FIG. 1A and FIG. 1B show perspective views of an driving module according to the present invention.

FIG. 1A shows a perspective view of a driving module 100 in combination with a gas discharge lamp 150. In the embodiment shown, the driving module 100 is suitably dimensioned for operating gas discharge lamps 150 for wattages of approx. 60 Watts or less. This power range of the gas discharge lamp 150 can be used in a multitude of mobile devices, in headlights of motor vehicles, etc. The driving module 100, which, in the manufacturing state shown, comprises at least the necessary components for supplying energy for igniting the gas discharge lamp, comprises a carrier 110 provided e.g. in the form of a housing or in some other suitable configuration of a carrier for accommodating electrical components for igniting and operating the gas discharge lamp 150. Furthermore, the carrier 110 has attached thereto a high-voltage ignition transformer 120, a lamp socket 130 and one or a plurality of electrical components 140. The carrier 110 additionally comprises an area 160 which is suitable for accommodating additional electrical components, whereas, as will be explained in more detail hereinbelow, other illustrative embodiments also comprise further electrical components of a functional group, fixed e.g. directly to the carrier 110, or a suitable circuit board for additional electrical components may be provided in said area 160.

In the embodiment shown, the carrier 110 comprises side parts 110S and a base plate 110B, made, at least partially, of a plastic material. The carrier 110 in the form of the side parts 110S and the base plate 110B thus encompasses a suitable volume, which is approximately 60 $cm^3$ or substantially less then 60 $cm^3$ for the above-mentioned power range of the discharge lamp 150 and in which all the electrical components required for igniting and operating the gas discharge lamp 150 are arranged or can be provided in a future manufacturing phase, with the exception of a connection to a power source, e.g. the power supply of a vehicle and the like. An adequate connection (not shown) of the driving module 100 to a power source can be established via suitable connections, such as a cable and the like, as well as via inductive coupling.

The carrier 110 additionally comprises a potting chamber 111, in which the transformer 120 is contained together with a potting material that is not shown in FIG. 1A. In the embodiment shown, the potting chamber 111 is provided with a chamber wall 111A, which separates the transformer 120 from the lamp socket 130, a passage 111B being, however, provided in the chamber wall 111A. In the embodiment shown, the passage 111B is, as required for potting the transformer 120 in the respective mounting phase, sealed by a sealing plate 135. The sealing plate 135 may be a component part of the lamp socket 130, which is composed of a high temperature resistant plastic material which remains dimensionally stable at temperatures higher than 105° C. and exhibits little outgassing or no outgassing at all, and which, in illustrative embodiments, is resistant even at temperatures in the range of 150° C. to approx. 200° C. To this end, plastic materials such as PPS, LCP and the like can be used. In connection with the present case of use, the lamp socket 130 is to be regarded as an area in which at least one high-voltage connection 151 of the gas discharge lamp 150 is introduced for electrically connecting in this way the connection 151 to electrical components attached to the carrier 110, e.g. to the ignition transformer 120. The actual mechanical fixation of the gas discharge lamp 150 can, however, be executed by means of a further component, which is attached to the carrier 110, e.g. on the side of the base plate 110B facing the gas discharge lamp 150. This fastening component (not shown) can be composed of an arbitrary suitable material. The lamp socket 130 includes as an integral component a conducting track 132, which establishes a connection to a high-voltage connection 131 of the lamp socket and to a high-voltage connection (shown in FIG. 1b) of the transformer 120. In the embodiment shown, the conducting track 132 may almost completely extend in the material of the lamp socket 130 and a respective connection point may lie within the potting chamber 111, as will be described hereinbelow with reference to FIG. 1B. In this case, the sealing plate 135 and the respective lamp socket material enclosing the conducting track 132 are to be regarded as integral components of the lamp socket 130, so that, when the lamp socket 130 is mounted on the carrier 110, the potting chamber 111 will simultaneously be sealed due to the insertion of the sealing plate 135 in the passage 111B of the chamber wall 111A. In the embodiment shown, the lamp socket 130 also comprises a low-voltage connection region 133, which is therefore also partially integrated in the plastic material of the lamp socket 130 and which is provided with a suitable contact region, e.g. in the form of a press-fit pin, a solder pin, a welding pin and the like. By means of the associated contact of the connection region 133, an electric connection to a printed circuit board, which comprises additional electrical components, can efficiently be established. In other embodiments a respective conduction for the low-voltage side of the gas discharge lamp 150 takes place via suitable conducting tracks establishing a connection to one or to a plurality of the electrical components 140, the ignition transformer 120, or the like.

The connection region 131 of the lamp socket is covered by a high-voltage cover 134 so as to avoid potting, when this region has been contacted. In other cases, the lamp socket 130 is provided with a potting area, which allows potting during a future phase after mounting of the discharge lamp, if reduced corona formation should be necessary.

Figure 1B:
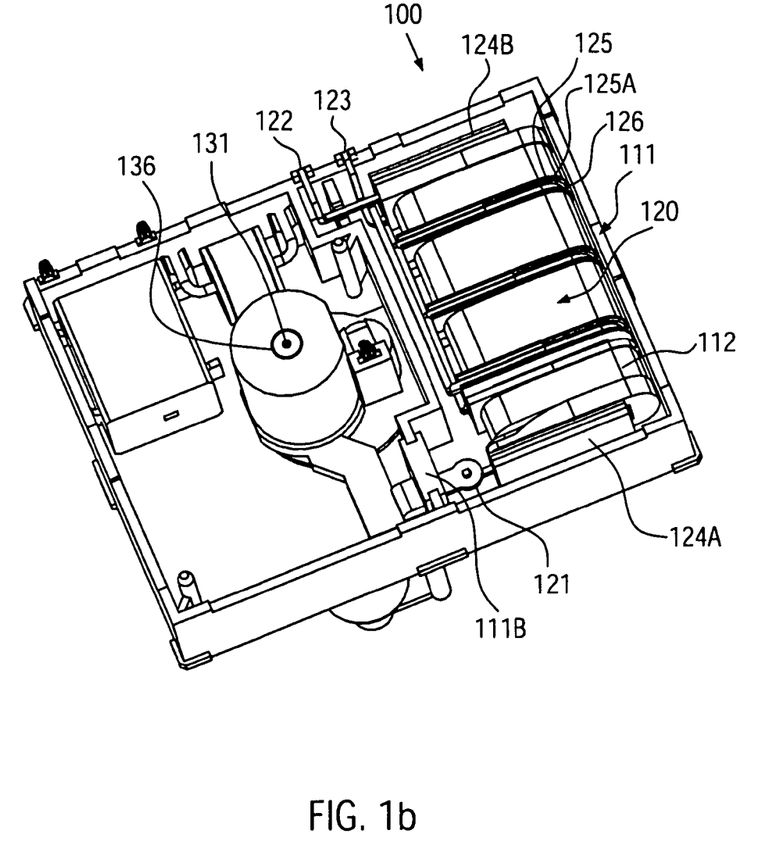

FIG. 1B schematically shows the driving module 100 in a further perspective view in which a high-voltage connection region 121 of the ignition transformer 120 is shown inside the potting chamber 111, the connection region 121 as well as the ignition transformer 120 being embedded in a potting material 112, so that high mechanical and electrical robustness is guaranteed. Also a potting region 136 is shown, which will be filled with a potting material in a future phase so as to seal the connection region 131 such that it is resistant to high voltages. Furthermore, additional connection regions 122 and 123 of the ignition transformer 120 are shown in FIG. 1B, which correspond e.g. to the connections of a primary winding and to one of the connections of a secondary winding of the transformer 120. It should, however, be noticed that an arbitrary connection of primary and secondary windings can be established in the ignition transformer 120 in accordance with the electric arrangement required.

In the embodiment shown, the ignition transformer 120 corresponds to a rod-shaped transformer with a core material (not shown), which does not have a closed magnetic circuit within the core material, consequently. The rod-shaped configuration, however, allows a very compact structural design and also a good behavior with respect to the winding of a respective coil body (not shown), so that space-saving and precise windings on the transformer 120 are obtained. In the embodiment shown, the available winding space for a secondary winding is divided by chamber partitions 125. Furthermore, the chamber partitions 125 have provided therein recesses 125A, which are adapted to receive therein a winding wire 126, so that a reliable electric insulation of the winding wire 126 is accomplished, at least in a lateral direction, by means of the chamber walls 125. In this way, one or a plurality of windings per chamber wall 125 can be provided on the basis of an economy-priced winding wire, which may, by way of example, only be provided with a simple insulation or possibly be applied without any insulation at all, in contrast to many conventional transformers in which the primary winding is realized by means of a multi-insulated and therefore very cost-intensive winding wire, so as to realize the necessary electric strength with respect to the secondary winding. The precisely defined position of the primary winding wires 126 in the chamber walls 125 also provides better coupling between the primary winding and the secondary winding, and also this contributes to a more advantageous electric behavior, since e.g. the secondary winding can be configured with a smaller number of windings, and will therefore require less space, or with a lower ohmic resistance. If two or more windings are provided in each of the chamber partitions 125, also a parallel connection of two or more primary windings can be accomplished, whereby the coupling behavior in its entirety will be improved still further.

In other embodiments (not shown) the primary windings 126 are at least partially integrated in the material of a respective coil body, e.g. in the chamber walls 125, so that after potting of the transformer 120 an excellent high-voltage insulating strength will be accomplished, a very good uniformity of the respective components of the ignition transformers being accomplished as well, since the position of the primary windings is predetermined by structural measures, i.e. by the injection molding of the winding sections. In the case of other embodiments, the primary winding can be applied in the form of a strip conductor. In this case an appropriate distance to the secondary winding can be established by the partitions 125 in association with the potting material 112, so that also in this case an advantageous overall height of the transformer 120 is achieved on the basis of the small thickness of the strip conductor, and the coupling will be improved as well.

In the embodiment shown, a respective ferrite plate 124A and 124B is provided on the end faces of the ignition transformer 120 so that the magnetic behavior in its entirety can be improved, whereas negative influences of possible conductive components, e.g. conductive shielding materials and the like, will be reduced; otherwise, these negative influences may, through respective eddy current losses in these conductive materials, contribute to a reduced output voltage of the ignition transformer 120. In spite of the non-closed structural design of the transformer core, a good magnetic behavior is obtained due to the provision of the ferrite plates 124A, 124B. In combination with the compact shape and the above-mentioned characteristics with respect to the application of the primary winding, a desired high total output voltage, e.g. in a range of from 20000 to 30000 volts, will be accomplished. The secondary winding has a sufficiently low ohmic resistance, so that, after the ignition, energy can be supplied from a ballast to the discharge lamp without major losses via the secondary side as a direct current path.

The driving module 100, as shown in FIGS. 1A and 1B, can be produced as described hereinbelow. First, the lamp socket 130 and the ignition transformer 120 are connected to one another via the connection area (cf. FIG. 1B). This can be done by laser welding, resistance welding, electric arc welding, etc., the connection region 121 as well as the conducting track 132 being composed of suitable materials so that they will act as welding partners for the respective connection technique. Since the conducting track 132 is connected to the ignition transformer 120 outside of the potting chamber 111, there will be no contamination of the chamber walls. Subsequently, the functional group comprising the lamp socket 130 in combination with the ignition transformer 120 is applied to the carrier 110, i.e. the transformer 120 is introduced in the potting chamber 111 whereby also the lamp socket 130 is adequately positioned. As has been described hereinbefore, the sealing plate 135 (cf. FIG. 1A) is provided in the case of a few embodiments, so that also the potting chamber 111, i.e. the passage 111B, will be sealed. In the case of some illustrative embodiments the plate 135 is an integral component of the lamp socket 130, whereas in other embodiments the plate 135 is applied separately, if e.g. a possible contamination of the sealing plate 135 during connection of the region 121 and the conducting track 132 is considered unsuitable. The lamp socket 130 can be fixed to the carrier 110, e.g. to the base plate 110B, by glueing, heat staking, hot gas riveting, crimping, etc. Subsequently, the potting chamber 111 is filled with potting material and suitably heated so as to reliably fix the ignition transformer 120 by curing the potting material and so as to improve the insulating liquid. Due to the open structural design of the ignition transformer 120 the potting material is able to effectively penetrate into the individual areas of the transformer 120 so that fast and void-free vacuum potting will be supported. In the case of some embodiments the sealing plate 135 may be wetted before the potting material is actually filled in, so that during a first curing of the wetted areas the leak tightness of the sealing plate is first increased, whereupon upon the actual potting of the potting chamber 111 takes place.

According to the above-described method of producing the driving module 100, the individual components, i.e. the ignition transformer 120, the carrier 110 and the lamp socket 130, are separately produced in a suitable manner and then connected to one another. The lamp socket 130 is here produced on the basis of suitable high temperature resistant plastic materials, as has been explained hereinbefore, while suitable injection molding processes are also used for producing the carrier 110. In so doing, additional materials can be incorporated into the plastic material, as will also be described in more detail in the following. Also the ignition transformer 120 can be assembled in an efficient manner with a high degree of automation due to the above-mentioned structural design.

Figure 1C:
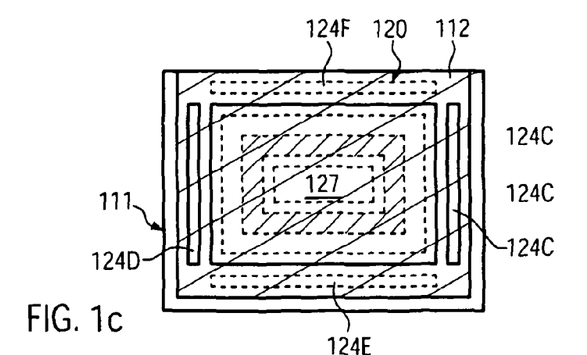
FIG. 1C to 1F show cross-sectional views of the driving module or of a part of the same, FIG. 1G schematically shows a perspective view.

FIG. 1C shows schematically a cross-sectional view of the potting chamber 111 with the ignition transformer 120. In the embodiment shown, the ignition transformer 120 is embedded in the potting material 112 and has a core 127 which has provided thereon, by means of an arbitrary suitable coil body, a secondary winding 128 in connection with the primary winding 126. As has been explained hereinbefore, at least certain areas of the primary windings 126 are partially integrated in a plastic material of the coil body, e.g. by providing adequate recesses in partitions, as has been explained hereinbefore, or parts of the primary winding 126 may also be fully integrated in the plastic material of the coil body. Furthermore, the embodiment shown comprises at least one additional ferrite plate in close vicinity to the ignition transformer 120 inside the potting chamber 111. For example, a ferrite plate 124D and/or a ferrite plate 124C and/or a ferrite plate 124E and/or a ferrite plate 124F may be provided additionally or alternatively to the ferrite plates 124A, 124B which have previously been shown in FIG. 1B. In this way, the magnetic characteristics can be adjusted in a flexible manner, without any substantial increase in the overall installed size being caused.

Figure 1D:
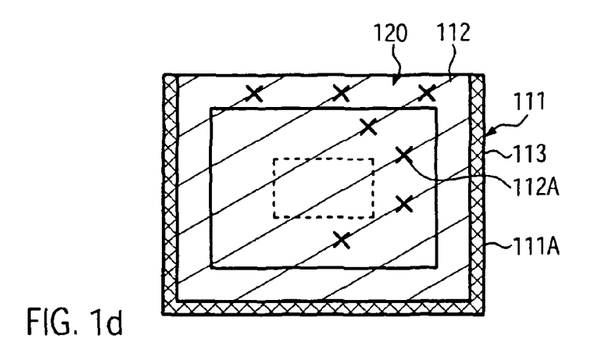

FIG. 1D shows schematically a cross-sectional view of a potting chamber 111 according to a further embodiment, in which a ferrite material 112A is contained in the potting material 112 and/or a ferrite material 113 is contained in at least part of the walls 111A of the potting chamber 111. In this way, a desired shielding behavior and an improvement of the magnetic characteristics can be achieved, without any increase in the installed size being necessary. The ferrite material 113 can be incorporated into the material of the walls 111A during production of the carrier 110 by adding suitable ferrite materials to the injection molding compound, or suitable layers or foils can be inserted in the injection mold when the injection molding process is being carried out, so that the material 113 will be provided within the walls 111A in a locally limited fashion.

Figure 1E:
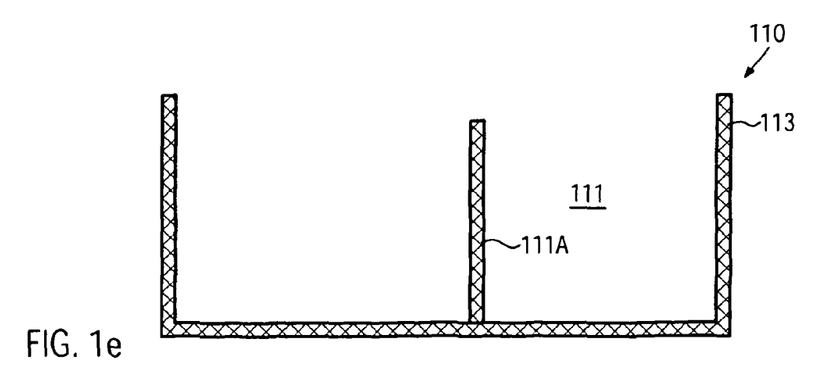

FIG. 1E shows schematically a cross-sectional view of the carrier 110, the ferrite material 113 being here provided across wide areas, e.g. in the whole plastic material of the carrier 110, so that magnetic shielding is accomplished for the whole carrier 110, while a shielding effect is also produced locally, e.g. as regards the potting chamber 111 with respect to the other areas of the carrier 110. The integrated ferrite material 113 can also contribute to an improved thermal conductivity of the plastic base material of the carrier 110, which can be provided in the form of an arbitrary suitable and economy-priced material, so that an efficient heat distribution can take place from a point with locally increased temperature, e.g. in the vicinity of the lamp socket, to peripheral areas of the carrier 110. In this way, a large part of the surface of or the whole surface of the carrier 110 can serve as a "cooling surface", so that additional measures, e.g. in the form of surface fins and the like, may possibly be dispensed with.

Figure 1F:
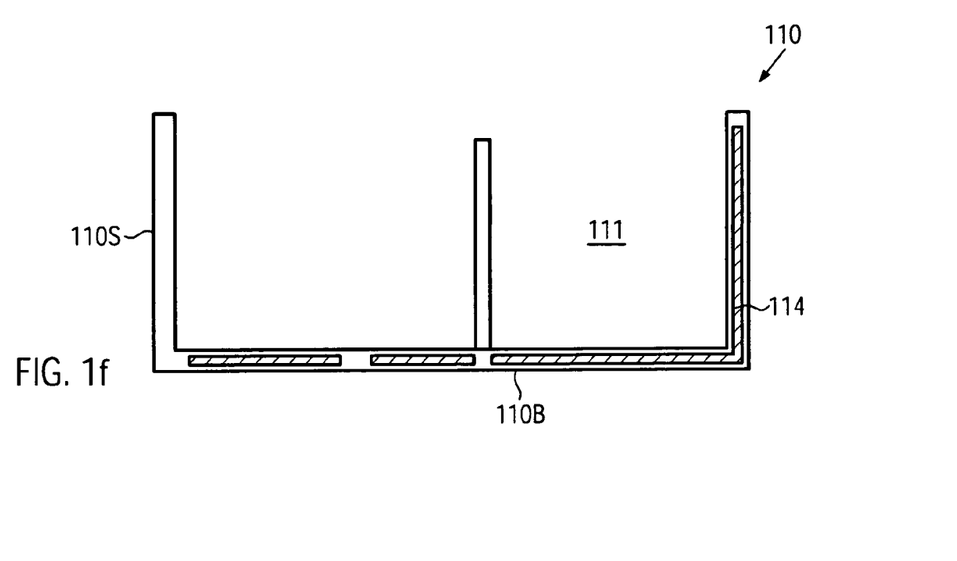

FIG. 1F shows schematically a cross-sectional view of the carrier 110 according to further embodiments, in which, additionally or alternatively to the material 113 (cf. FIG. 1E), a material 114 is provided in a locally limited fashion with respect to the layer thickness of the side walls 110S and of the base plate 110B, respectively. The material 114 represents e.g. an electrically conductive material so as to achieve adequate electromagnetic shielding. As has been explained hereinbefore, a ferrite material can ensure magnetic shielding especially of the potting chamber 111 so as to reduce respective eddy current losses in the material 114. The material 114 may also be provided in the form of a material having a high thermal conductivity, e.g. as a conductive material or as a non-conductive material, so that a good distribution of the waste heat can be achieved, as has also been explained hereinbefore. In the case of illustrative embodiments, at least part of the material 114 can be provided in the form of metal tracks, which are also used as electric connections between the individual electrical components.

In the above-described embodiments the materials 113 and 114 can be incorporated during injection molding of the carrier 110, so that the thermal and/or electrical and/or magnetic characteristics can be adjusted in an easily reproducible manner.

Figure 1G:
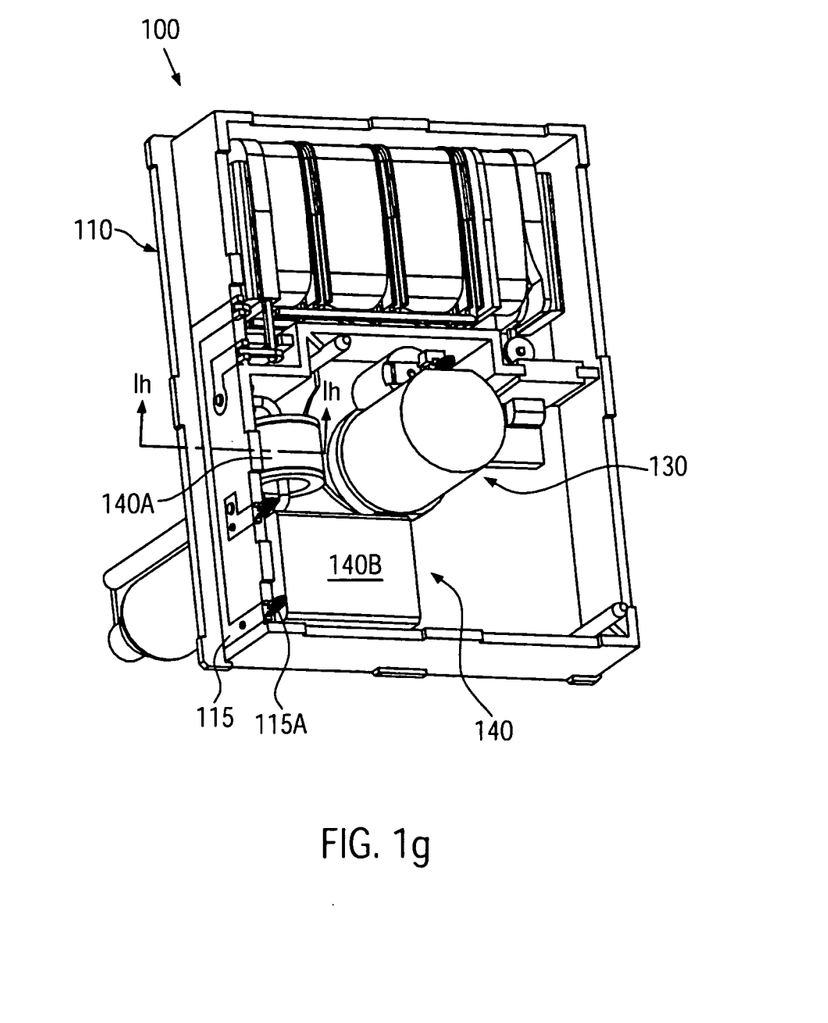

FIG. 1G schematically shows a perspective view of the driving module 100, in which electric conducting tracks 115 are provided in the material of the carrier 110. The conducting tracks 115 may, for example, represent parts of the material 114 shown in FIG. 1F, when said material is incorporated in the form of a suitable conductor during the production of the carrier 110. In other embodiments, the conducting tracks 115 are specially integrated in the material of the carrier 110 at suitable positions during the injection molding process, without intending to provide additional functions, such as shielding, heat conduction and the like. In the case of one embodiment, the carrier 110 is produced such that the conducting tracks 115 can be incorporated in a separate production step. To this end, suitable recesses may be provided in the carrier 110 at the desired positions, so that the plastic base material of the carrier 110 can be produced making use of efficient and economy-priced injection molding processes, the position of the conducting tracks 115 being, nevertheless, determined precisely. Prior to or after the mounting of the electrical components 140, the conducting tracks 115 can be inserted and, if necessary, fixed mechanically by means of arbitrary suitable methods, such as heat staking, etc. If necessary, the conducting tracks 115 are provided with connection areas 115A, so that contacting with additional components, e.g. a printed circuit board and the like, can be accomplished without additional soldering.

For mounting the electrical components 140, which represent in association with the ignition transformer 120 and the conducting tracks 115 an ignition unit, one embodiment is so conceived that the components 140 are mechanically fixed to the carrier 110 such that a high vibration resistance is accomplished. To this end, the contour of the carrier 110 is, in certain areas thereof, suitably adapted to the contour of the electrical components 140, e.g. to the contour of a capacitor 140B and/or of a discharger 140A, so that the desired mechanical robustness will be obtained, if necessary with additional fixing by means of silicone, an adhesive, etc.

Figure 1H:
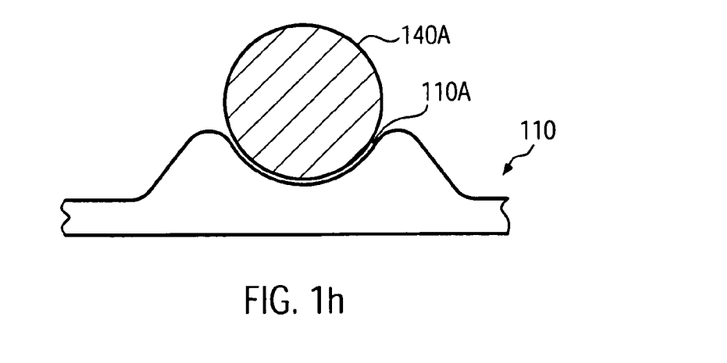
FIG. 1H shows a sectional view according to FIG. 1G, in which the contour of the carrier simulates the contour of an electrical component.

FIG. 1H schematically shows a cross-sectional view according to the section IH of FIG. 1G, wherein a part of the carrier 110 has a contour 110A which simulates the contour of the discharger 140A, so that an adequate mechanical stability, which may, if necessary, be improved by providing additional materials, will already be obtained when mounting and contacting with the conducting tracks has been finished. The vibration resistance, in particular that of the comparatively large electrical components, such as the discharger 140 and the capacitor 140B (cf. FIG. 1G), is of great importance, in particular for cases of use in the automotive field, since the reliability of the driving module depends on the correct and reliable function of these components to a substantial extent.

Figure 1I:
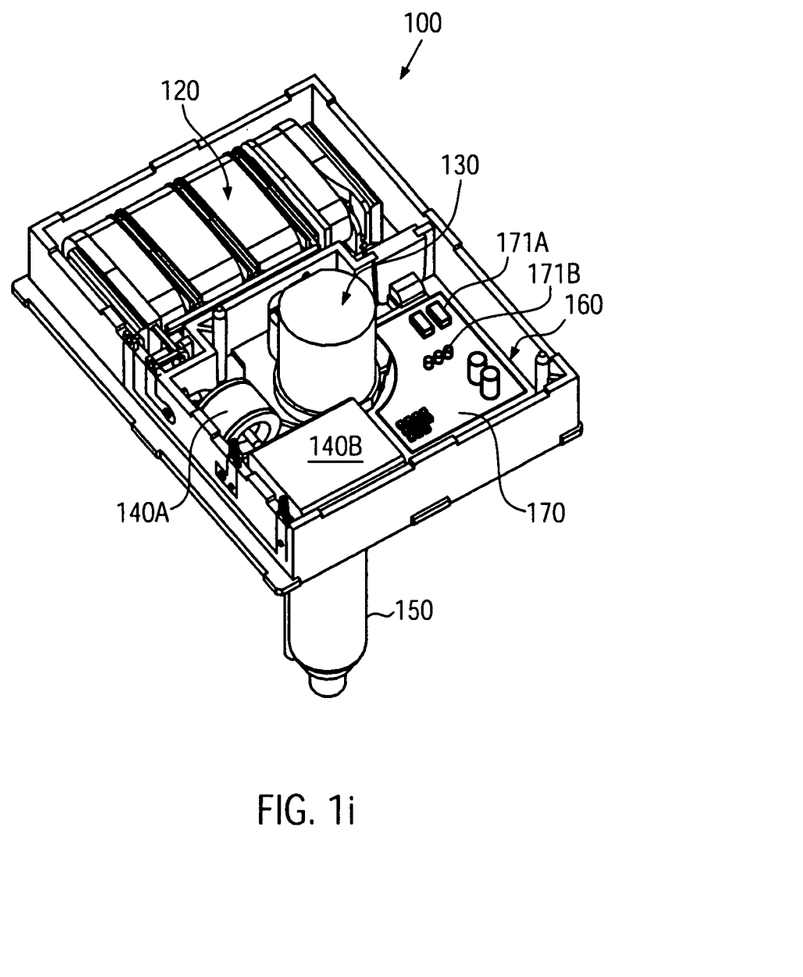
FIG. 1I shows schematically a perspective view of the driving module with an additional printed board.

FIG. 1I schematically shows the driving module 100 including in the spatial area 160 a printed circuit board 170 on which additional electrical components 171A, 171B are arranged. The components 171A, 171B represent electrical components which are required for a further functional group of the module 100, e.g. for operating the discharge lamp in a continuous mode, for controlling ignition, etc., so that in an illustrative embodiment a self-sustaining operation of the module 100 is possible by simply feeding an operating voltage by means of an ignition unit composed of the components 120 and 140, and the additional components 171A, 171B. On the basis of this modular design, in particular the printed circuit board 170 can be produced and populated separately and can then be suitably arranged in the spatial area 160 of the carrier 100 and connected via respective connections of the conducting tracks provided in the carrier 100. The components 171A, 171B, for example, comprise at least some of the electrical components for producing a suitable direct voltage or alternating voltage in the range of a few 10 volts up to several hundred volts, so as to allow a continuous operation of the discharge lamp 150 after ignition. Furthermore, the components 171A, 171B may also represent parts of a circuit required for executing reliable monitoring and control.

The position of the circuit board 170 is chosen such that, in addition to achieving a compact structural design, also suitable thermal conditions within the module 100 are established in such a way that a reliable operation of the components 171A, 171B will be possible. Furthermore, by means of suitable measures, e.g. ferrite plates, shielding materials and the like, which have also been mentioned hereinbefore, adequate conditions can be created with respect to the interference radiation. For example, the circuit board 170 can be arranged such that a ferrite material will be present between the transformer 120 and the circuit board 170, as has also been explained exemplarily in detail hereinbefore. Furthermore, the circuit board 170 according to one embodiment is adequately configured such that it includes at least partially a suitable material for the purpose of shielding, e.g. in the form of a ferrite material. In the case of other embodiments, standard conducting track materials can be applied to an adequate carrier having the necessary characteristics, e.g. with respect to shielding. According to other embodiments, the printed circuit board is provided in the form of a molded interconnect device (MID) so that, especially with respect to the base materials and the conducting track materials, a high degree of flexibility exists, while allowing also an efficient production of the circuit board 170 in accordance with the requirements that have to be met for integration in the module 100. In other embodiments, additional electrical components are provided, which are not part of the circuit board 170 and which can therefore be applied directly to the carrier 100, the necessary electric connections being provided in or on said carrier 100, so that the latter serves as part of a "printed circuit board". In addition, the printed circuit board 170, especially when implemented in MID technology, can be given an arbitrary appropriate shape so as to fulfil additional functions in the driving module 110, as shown in FIGS. 1J and 1K.

Figure 1J:
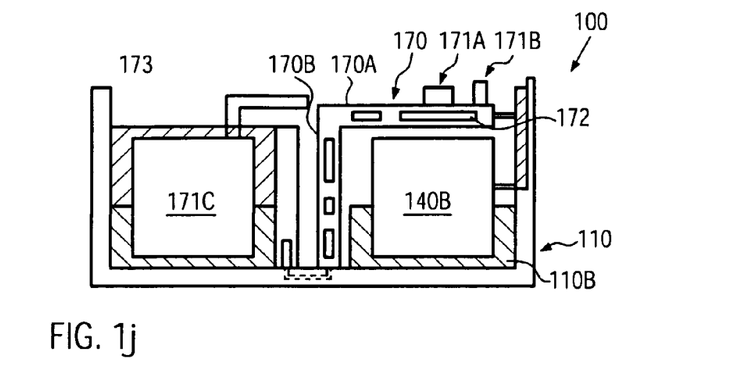
FIGS. 1J and 1K show cross-sectional views of the driving module according to further illustrative embodiments, in which additional components are mounted on the carrier and a printed board is additionally provided.

FIG. 1J schematically shows a cross-sectional view of the driving module 100, in which e.g. the component 140B, i.e. a capacitor, is attached to the carrier 110 in a suitable manner, e.g. by adapting a contour 110B of the carrier 110 to said component 140B. Furthermore, the circuit board 170 is provided such that it is attached to the carrier 110 in a "three-dimensional" configuration so as to save space. To this end, the circuit board 170 has a first board area 170A and a second board area 170B, which are arranged such that they extend at an angle relative to each other, so that the space required in the carrier 110 will be reduced, although the necessary number of electrical components 171A, 171B and of the associated electrical conducting tracks 172 can still be provided. Especially by making use of the MID technology, arbitrary adequate design variants for the circuit board 170 can be provided so as to achieve an optimum utilization of the installation space within the carrier 110. In the embodiment shown, a further electrical component 171C is additionally provided, which does not directly belong to the ignition unit of the driving module 100. Said component 171C represents, by way of example, a structural element which has a large volume or which is heavy in comparison with the electrical components 171A, 171B and which is secured to the carrier 110 in a suitable manner, e.g. by providing a potting chamber 173 and potting the structural element, by designing the carrier 110 with a suitable contour, and the like. Typically, it will e.g. be necessary to provide additional inductive components, e.g. a coil and/or a transformer, in the driving module 100 so as to provide the direct voltage or the alternating voltage required for the continuous mode of operation. The component 171C can thus reliably be attached to the carrier and electrically connected in a suitable manner, when the carrier 110 is being populated with the components 140 and the transformer 120 (cf. FIG. 1A). In this way, mounting of the circuit board 170, which carries the additional components required for the control and the continuous mode of operation, is simplified, since a higher degree of flexibility for a suitable structural design is accomplished. Furthermore, when heavy and voluminous components, e.g. the component 171C, are directly fixed to the carrier 110, this offers the possibility of obtaining an improved mechanical stability.

Figure 1K:
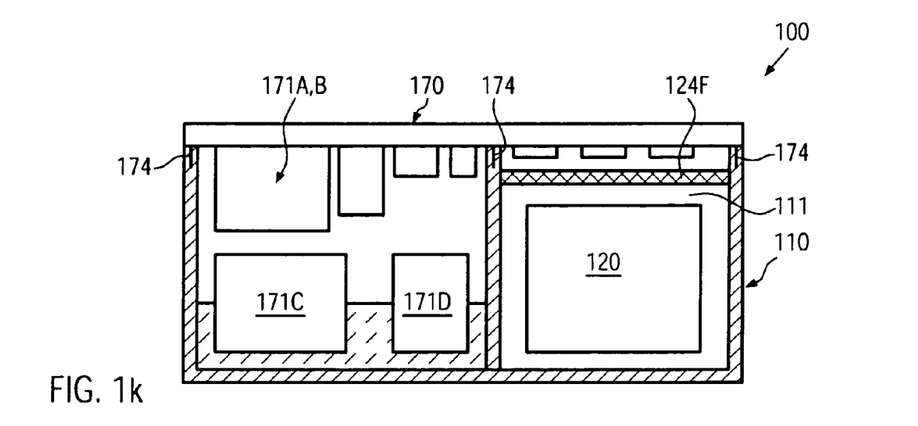

FIG. 1K schematically shows a cross-sectional view of another embodiment of the driving module 100, in which the circuit board 170 serves as a cover of the carrier 110. Here, e.g. connection means 174 are provided so as to establish a connection to conducting tracks of the carrier 110 at the appropriate points, said conducting tracks extending e.g. in the housing walls of the carrier 110, as has also been explained hereinbefore. If necessary, suitable connection points may also be provided in the carrier 110, so that, in addition to or alternatively to the connection areas 174 for the walls of the carrier 110, additional connection points or contact points are created. Furthermore, the additional components 171C, 171D are directly provided on the carrier 110 and adequately contacted in the embodiment shown, so that in particular heavy and voluminous structural elements need not be arranged on the printed board 170. In addition, a ferrite plate 124F is disposed at least between the high-voltage transformer 120 and the printed board 170 so as to reduce magnetic disturbance in the printed board 170 and so as to reduce also an influence of the printed board 170 on the transformer 120, which may be caused e.g. through the generation of eddy currents and the like.

What is claimed is:

1. A driving module for a gas discharge lamp comprising:
   a carrier for accommodating electrical components for igniting and operating the gas discharge lamp after ignition,
   an ignition transformer fixed in position on the carrier,
   a lamp socket attached to the carrier and composed, at least partially, of a high temperature resistant plastic material, which is dimensionally stable at least at temperatures higher than 105° C. and which includes an integrated conducting track for connecting a high-voltage connection of the gas discharge lamp to a high-voltage connection of the ignition transformer, and
   a plurality of electrical components fixed to the carrier and configured for supplying, in association with the ignition transformer, the gas discharge lamp with energy at least during the ignition process.

2. A driving module according to claim 1, wherein at least part of the carrier is composed of a plastic material having a lower temperature resistance than the lamp socket.

3. A driving module according to claim 1, wherein said lamp socket additionally comprises a low-voltage connection region configured for contacting a low-voltage connection of the discharge lamp and for establishing a connection to a low-voltage line of the driving module.

4. A driving module according to claim 1, wherein the lamp socket additionally comprises a high-voltage connection region which is adapted to be insulated by a high-voltage cap such that it is resistant to high voltages.

5. A driving module according to claim 1, wherein the lamp socket comprises a high-voltage connection region surrounded by a potting space for receiving therein a potting material after contacting of the high-voltage connection of the discharge lamp.

6. A driving module according to claim 1, additionally comprising a potting chamber which laterally encompasses the ignition transformer and which is filled with a potting material.

7. A driving module according to one claim 1, wherein a ferrite material is provided at least in some areas adjacent to the ignition transformer.

8. A driving module according to claim 7, wherein at least a part of the ferrite material is provided in the form of at least one ferrite plate in the interior of the potting chamber.

9. A driving module according to claim 8, wherein the ignition transformer is elongate in shape and a respective ferrite plate is arranged on each end face of the ignition transformer.

10. A driving module according to claim 8, wherein the ignition transformer is elongate in shape and at least one additional ferrite plate is provided on at least one side other than an end face.

11. A driving module according to claim 6, wherein ferrite material is contained in the potting material and/or in wall areas of the potting chamber.

12. A driving module according to claim 1, wherein the carrier comprises a base plate and at least side parts, and wherein the base plate and/or one or a plurality of the side parts are composed of a plastic material, and said plastic material has integrated therein one or a plurality of conductive or non-conductive materials containing metal.

13. A driving module according to claim 12, wherein said one or said plurality of conductive or non-conductive materials containing metal comprise a filling material for increasing the thermal conductivity of the carrier at least locally.

14. A driving module according to claim 13, wherein the filling material is a ferrite material.

15. A driving module according to claim 13, wherein the filing material comprises aluminum oxide.

16. A driving module according to claim 12, wherein a conductive material is integrated.

17. A driving module according to claim 16, wherein one or a plurality of metal tracks is integrated.

18. A driving module according to claim 17, wherein at least one of said one or said plurality of metal tracks is connected as a conducting track for connecting the electrical connections.

19. A driving module according to claim 1, wherein the contour of the carrier is adapted to the contour of at least some of the electrical components for improving the vibration resistance.

20. A driving module according to claim 19, wherein said some of the electrical components comprise a capacitor and a discharger.

21. A driving module according to claim 1, wherein said electrical components define an ignition unit as a first functional group of the driving module, and wherein at least some of the conducting tracks of the ignition unit are integrated in the material of the carrier.

22. A driving module according to claim 21, wherein a second functional group comprising additional electrical components is provided, at least some of said electrical components being mounted on a printed circuit board which is connected to the ignition unit via connections.

23. A driving module according to claim 22, wherein at least some of the connections are solderless connections.

24. A driving module according to claim 22, wherein the printed circuit board is configured as a molded interconnect device.

25. A driving module according to claim 24, wherein the printed circuit board is a part of the carrier.

26. A driving module according to claim 22, wherein the printed circuit board comprises at least two circuit board areas extending at an angle relative to one another.

27. A driving module according to claim 22, wherein a shielding material is disposed between conducting tracks of the printed circuit board and the ignition transformer.

28. A driving module according to claim 27, wherein the shielding material is provided in the form of a ferrite material.

29. A driving module according to claim 27, wherein the shielding material is provided as a part of the printed circuit board.

30. A driving module according to claim 21, further comprising an additional component which belongs to a further functional group and which is fixed to the carrier.

31. A driving module according to claim 30, wherein the additional component represents a coil or a transformer.

32. A driving module according to claim 1, wherein the lamp socket is suitable for accommodating a discharge lamp with a wattage ranging from 15 to 60 Watts.

33. A method of producing a driving module for a discharge lamp, comprising the steps of:
    connecting a conducting track, which is partially integrated in a plastic material of a lamp socket, to an ignition transformer of an ignition unit of an activation module,
    introducing the ignition transformer into a potting chamber after connection, said potting chamber being attached to a carrier of the driving module, and
    filling the potting chamber with a potting material.

34. A method according to claim 33, further comprising: mechanically fixing the lamp socket to the carrier outside of the potting chamber prior to filling the potting chamber.

35. A method according to claim 34, wherein the lamp socket is mechanically fixed such that a passage in the potting chamber used for passing a conducting track therethrough is sealed.

36. A method according to claim 33, further comprising:
    producing, in at least one plastic wall of the carrier, at least one connection conducting track for connecting electrical components.

37. A method according to claim 36, wherein at least one recess is formed in said at least one plastic wall and a conducting track is inserted in said at least one recess.

38. A method according to claim 33, further comprising:
    integrating a material in a plastic base material of a carrier so as to increase the shielding effect and/or the thermal conductivity.

* * * * *